Dec. 29, 1931. T. E. MURRAY, JR 1,838,322
WHEEL AND METHOD OF PRODUCTION
Filed Nov. 5, 1928 3 Sheets-Sheet 2
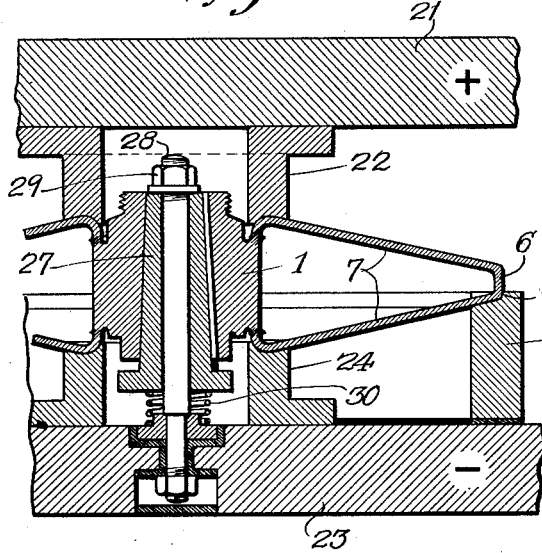
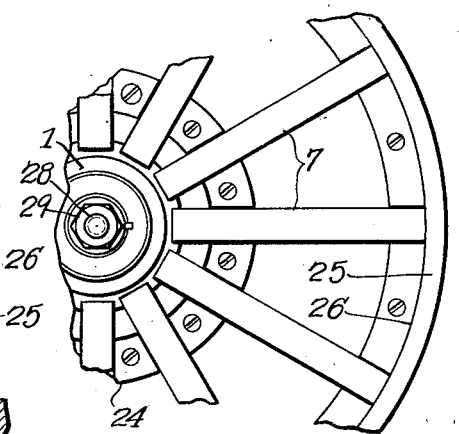
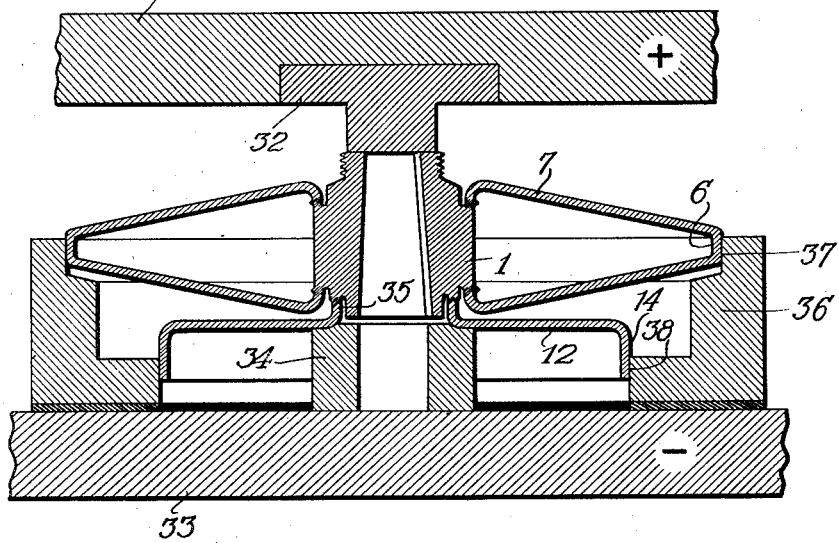
Inventor
THOMAS E. MURRAY JR.
By His Attorney Dec. 29, 1931. T. E. MURRAY, JR 1,838,322
WHEEL AND METHOD OF PRODUCTION
Filed Nov. 5, 1928   3 Sheets-Sheet 3

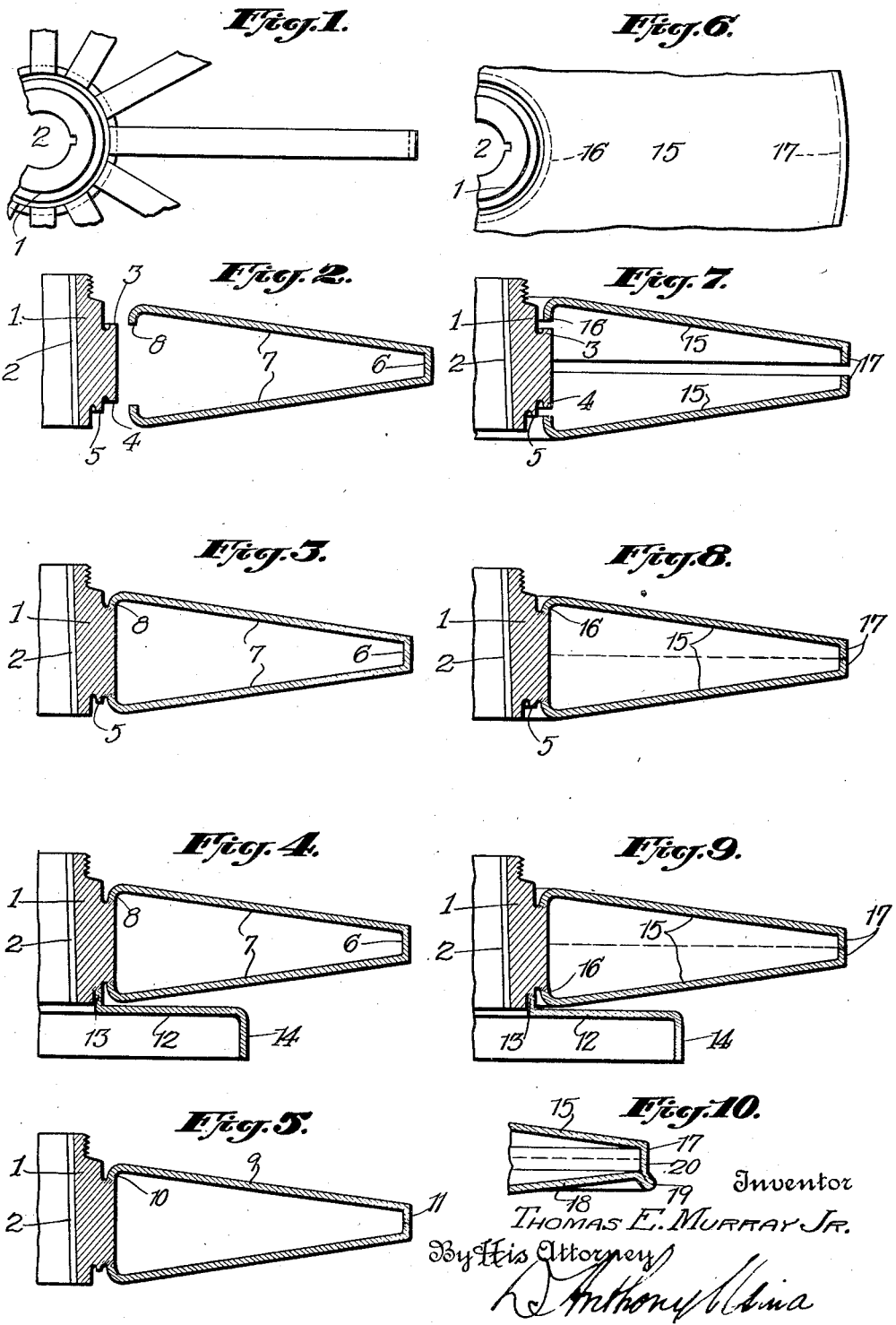

Inventor
THOMAS E. MURRAY Jr.
By His Attorney
D. Anthony Usina

Patented Dec. 29, 1931

1,838,322

UNITED STATES PATENT OFFICE

THOMAS E. MURRAY, JR., OF BROOKLYN, NEW YORK, ASSIGNOR TO METROPOLITAN ENGINEERING COMPANY, A CORPORATION OF NEW YORK

WHEEL AND METHOD OF PRODUCTION

Application filed November 5, 1928. Serial No. 317,230.

My invention provides an economical method of manufacturing wheels particularly traction wheels for automobiles and other vehicles.

The accompanying drawings illustrate an embodiment of the invention.

Fig. 1 is an elevation of the hub and surrounding spokes of the complete wheel;

Figs. 2, 3 and 4 are radial sections showing successive stages in the application of the spokes and brake drum;

Fig. 5 is a view similar to Fig. 3 illustrating a modification;

Fig. 6 is a view similar to Fig. 1 showing the portion of the wheel surrounding the hub in the form of a disc instead of spokes;

Figs. 7, 8 and 9 are radial sections illustrating different stages in the application of the surrounding disc and brake drum;

Fig. 10 illustrates a modification of Fig. 8;

Fig. 11 is a radial section illustrating the welding of spokes;

Fig. 12 is a fragmentary plan of the same omitting the upper electrode;

Fig. 13 is a section similar to Fig. 11 illustrating the welding of the brake drum;

Figure 14:
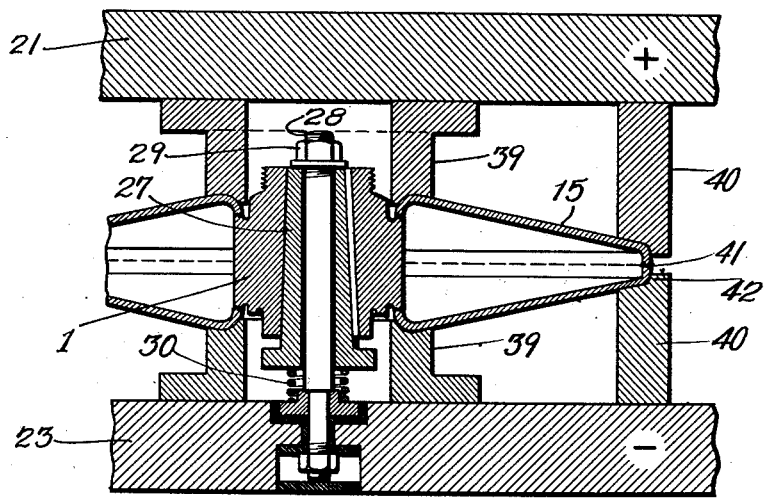
Figs. 14 and 15 are views similar to Figs. 11 and 12 illustrating the making of a disc wheel.
Figure 15:
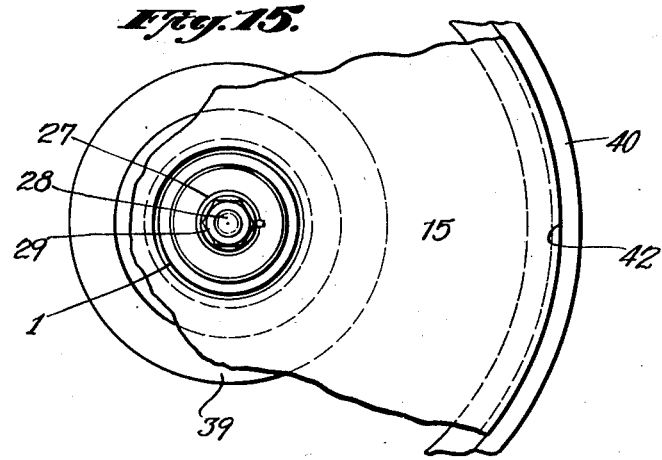

Referring to the drawings, a wheel hub 1 is machined to the desired dimensions with an exactly centered hole 2 for the axle, with shoulders 3 and 4 facing toward the opposite ends on which the surrounding part or parts of the wheel are to be welded and also with a shoulder 5 near one end on which the brake drum is to be welded. Such a hub may be cut out of bar stock on a screw machine and thus produced at a minimum cost; or it may be of forged or cast metal, if the design requires it.

Each of the spokes consists of a flat strip bent to form a circumferential end portion 6 of slight width in the axial direction and a pair of radial portions 7 diverging toward their inner ends and having inward flanges 8 on such ends which fit squarely on the shoulders or projections 3 and 4 of the hub.

The flanges 8 are welded on the hub as in Fig. 3, preferably by electric resistance welding, pressing the parts together substantially in the direction of the axis of the wheel so that there is no distortion of the parts of the spoke. Substantially the same product can be produced in the manner of Fig. 5 using two separate parts 9 forming opposite sides of one spoke with flanged ends 10 welded to the hub, their outer ends 11 being also welded together as illustrated to produce the axially extending portion corresponding to the portion 6 in Fig. 3.

Preferably also a brake drum is applied to the hub in the same way. In Fig. 4 for example, a flat disc 12 has a hole in the centre surrounded by an axial flange 13 which is welded to the projection 5 of Fig. 2, the disc having an outer axially extending flange 14 around its outer edge. The flange 14 is formed before the welding operation.

It is important that the flange or brake drum 14 and also that the ends of the spokes be truly circular about the axis of rotation of the wheel as a centre. The present invention provides for the greatest accuracy by a very simple method which can be applied in production on a large scale.

Instead of spokes, the surrounding portion of the wheel may be in disc-form, perforated or imperforate and of various shapes in section. Figs. 6 to 10 show the invention applied in this way. The hub is the same as in Fig. 1. The disc is in two evenly flat conical portions 15 each with a central opening surrounded by an inward flange 16 and having a short axial flange 17 surrounding its outer edge. These parts are welded to the projections 3 and 4 and to each other to produce a wheel with the two discs or parts converging toward the outer edge and welded firmly at the inner edge to the hub.

Fig. 9 shows the same construction with an added welded brake drum as in Fig. 4. This wheel is finished in the same way as that of Figs. 1 to 5; by centering the machined portion of the hub in the electrode and holding the outer portion of the discs and the brake drum to be true circles about the axis of the hub and the axis of rotation of the wheel when mounted on its axle.

Various shapes of spokes and discs may be applied in this way, all of which I have referred to as the portion of the wheel surrounding the hub.

Fig. 10, for example, shows a disc made of one part 15 shaped as in the previous figures, and a second part 18 crimped at its outer edge to form a flange 19 which is continued to form the inward flange 20 to be welded to the opposite flange 17. The outwardly extending flange 19 may be shaped in various ways to serve as stops in the applying of various shapes of rim or felloe to the outer edge of the disc.

In applying spokes to the hub, electrodes may be used of the type shown in Figs. 11 and 12. An upper electrode 21 has fastened on its underface a ring 22 which bears on the inner ends of the upper portions 7 of the spokes. The lower electrode 23 has fastened on its upper face a similar ring 24 bearing on the lower portions 7 of the spokes. An insulated ring 25 is fastened also on the lower electrode 23 and has an internal circular face or shoulder 26 which accurately holds the ends of the spokes in a true circle about the center of the hub which is the axis of rotation of the wheel.

When the two electrodes are pressed together to weld the inner ends of the portions 7 to the hub, these portions by reason of the inwardly turned ends at the center are pressed outward against the shoulder 26 to ensure correct centering. The correct spacing and radial position of the spokes is maintained by properly spaced recesses in the faces of the rings 22, 24 and 25 which engage the inner and outer ends of the spokes.

The hub is centered on a plug 27 on which it fits accurately and which is arranged to slide on an insulating post or mandrel 28 mounted on the electrode 23. A nut 29 on the upper end of the post holds the plug 27 down and a spring 30 holds it up yieldingly so that the plug 27 and hub closely fitted thereto can move downward to allow the necessary take-up during the welding operation.

The brake drum is applied in a subsequent operation, Fig. 13. An upper electrode 31 has a conducting block 32 bearing on top of the hub. The lower electrode 33 has a conducting block in the form of a ring 34 bearing on the inner portion of the disc 12 so as to press the inner flange 35 against the shoulder on the hub. This flange fits loosely around the end of the hub so as to allow slight play for accurate centering. An insulated ring 36 centers the parts. It has a circular shoulder or face 37 which engages the ends of the spokes and a smaller circular face 38 which fits the flange 14. Thus the brake drum is held accurately in a central position with respect to the wheel during the welding operation, notwithstanding any distortion of the central portion during the welding.

In the case of disc wheels, the electrodes are as shown in Fig. 14. The lower electrode 22 carries a post or mandrel 28 on which is a plug 27 receiving the hub 1. Each electrode carries a pair of rings 39 and 40. The inner rings bear against the inner ends of the parts 15 of the disc. The outer rings 40 are also of conductive material for welding the joint 41. Also they have shoulders which provide inner circular faces 42 which hold the disc centered truly about the axis of the hub during the welding operation.

The brake drum may be welded to the disc wheel by the same electrode and centering arrangement as for a spoked wheel, Fig. 13.

I have not illustrated the felloe or rim of the wheel. These parts may be of any suitable design, permanent or detachable. The combination of hub and spokes or disc may be in fact a separate and complete article of manufacture.

Various modifications may be made by those skilled in the art without departing from the invention as defined in the following claims.

1. A vehicle wheel comprising a hub having outward projections and two discs with central openings and having their edges bent at such angles to the plane of the disc that the inner edges may be butt welded in one operation to said outward projections on the hub, and their outer edges welded together, said discs being welded to said hub at their inner edges and having their outer edges welded together.

2. An article of manufacture comprising a wheel hub having shoulders on its exterior and a surrounding portion of the hub comprising two portions of sheet metal spaced from each other in the axial direction of the hub and having inner edges bent toward each other and welded to shoulders on the hub.

3. An article of manufacture comprising a wheel hub having external shoulders and a surrounding portion of the wheel comprising two portions of sheet metal spaced from each other in the axial direction of the hub and having inner edges bent toward each other and welded to shoulders on the hub and having also outer edges bent toward each other and welded together.

4. In the production of vehicle wheels the method which consists in providing a hub with shoulders in two planes transverse to the axis, applying a surrounding portion in two parts with inner edges bent toward each other and engaging said shoulders and welding said inner ends to said shoulders in one welding operation.

5. In the production of vehicle wheels the method which consists in providing a hub with shoulders in two planes transverse to the axis, applying a surrounding portion in two parts with inner edges bent toward each other and engaging said shoulders and with outer edges bent toward and engaging each other and welding said inner edges to said shoulders and said outer edges to each other.

6. In the production of vehicle wheels the method which consists in providing a hub with shoulders having transverse faces in two planes transverse to the axis, applying a surrounding portion in two parts with inner edges bent toward each other and engaging said shoulders and welding said inner ends to said shoulders, providing a brake drum with a central axial flange and welding said flange to a transverse face of the hub.

7. In the production of vehicle wheels the method which consists in providing a hub with shoulders in two planes transverse to the axis of the hub, applying a surrounding portion having two parts with inner edges bent toward each other and engaging said shoulders and welding said inner edges to each shoulder to form a hollow hub surrounding portion.

8. In the production of hollow spoke wheels, the method which comprises forming complementary hollow spoke members about a hub with opposed side and peripheral edges meeting in a plane and with inturned central edges abutting shoulders in said hub in axially separated planes, supporting the peripheral ends of said spoke elements centered on the axis of said hub, and butt welding said complementary spoke elements to each other or their opposed edges and simultaneously to said hub.

9. A method of forming hollow spoke wheels which comprises forming complementary hollow spoke members about a hub with opposed radial and peripheral edges meeting in a common plane and with inturned inner edges abutting shoulders on said hub in axially separated planes supporting peripheral ends of said spoke elements in a circle surrounding the axis of said hub and simultaneously welding said elements to each other on their opposed edges and to said hub by the passage of a current and the application of pressure axially of said assembled spoke and wheel hub elements.

10. An article of manufacture comprising a wheel hub and spoke elements consisting of two portions of sheet metal spaced from each other in an axial direction and having inner edges bent toward each other and welded to shoulders on said hub and having side and outer edges bent toward each other and welded together.

In witness whereof, I have hereunto signed my name.

THOMAS E. MURRAY, Jr.